Patented Dec. 5, 1950

2,533,140

UNITED STATES PATENT OFFICE 2,533,140

BARIUM TITANATE-STANNIC OXIDE CERAMIC

Antonio R. Rodriguez, Oak Park, Ill., assignor to Zenith Radio Corporation, a corporation of Illinois No Drawing. Application December 15, 1948, Serial No. 65,502

4 Claims. (Cl. 106—39)

This invention relates to vitrified ceramic materials and more particularly to such materials of the type susceptible to permanent polarization to exhibit a remanent piezoelectric effect.

In the copending application of Walter L. Cherry, Jr., Serial No. 770,163, filed August 22, 1947, for Piezo-Electric Transducers, which application is assigned to the same assignee as the present application, there is disclosed and claimed a novel method for rendering a ceramic material permanently piezoelectric. The materials contemplated in that copending application are polycrystalline aggregates of vitrified barium titanate or barium strontium titanate. It is a primary object of the present invention to provide a vitrified ceramic material which is more susceptible to permanent polarization than the materials suggested in the copending application.

It is a more particular object of the present invention to provide a vitrified ceramic material which, when rendered permanently piezoelectric, is characterized by a higher electromechanical coupling coefficient and/or a higher dielectric constant than heretofore attainable with other polycrystalline aggregates.

The present invention provides a vitrified ceramic material which consists essentially of barium titanate and a minor proportion of stannic oxide; preferably, the material consists essentially of barium titanate in an amount greater than 96% by weight and stannic oxide in an amount less than 4% by weight.

The features of the invention which are believed to be novel are set forth with particularity in the appended claims. The invention together with further objects and advantages thereof may more readily be understood, however, by reference to the following description.

The present invention provides a vitrified ceramic material which consists essentially of barium titanate and a minor proportion of stannic oxide and which is particularly capable of exhibiting permanent polarization effects. This material, when so polarized, exhibits a particularly high remanent piezoelectric effect, the electromechanical coupling coefficient being substantially greater than that heretofore obtainable in other polycrystalline aggregates of barium titanate or barium strontium titanate.

In many applications, it is desired to produce a piezoelectric transducer, the thickness of which is very small relative to the other two dimensions. Such a transducer might find particular utility as a hearing aid microphone, a phonograph pickup, or the like. For purposes of illustration, and in no sense by way of limitation the following process may be employed to produce a vitrified ceramic piece which is suitable for use as such a transducer.

The ingredients in finely powdered form, which consist essentially of barium titanate in an amount greater than 96% by weight and stannic oxide in an amount less than 4% by weight, are thoroughly mixed and formed by any of the conventional ceramic processes, as for example by pressing and casting. Commercially available barium titanate ordinarily contains as impurities in an amount of the order of 2% or less one or more of the group consisting of silica, alumina, the alkaline earth metal oxides, the alkali metal oxides, and others. Ordinarily such impurities are present in sufficient amount to serve as a ceramic bond for the aggregate; however, in the event that the barium titanate used does not contain impurities in the form of glass forming oxides, it may be necessary to add to the mixture a small amount of such oxides to serve as a ceramic bond.

Although as stated above, the pieces can be formed by any of the conventional ceramic processes, it is preferred to use the dry press method. The mixture is granulated with a small amount of appropriate organic binder, such as a solution of of dextrine or polyvinyl alcohol in water, or a suitable gum or resin to a fineness of about 60 to 80 mesh, and the granulated mixture is prepared for dry pressing by reducing the moisture content to an appropriate amount, as for example of the order of 1% or less, by any suitable drying process. The mixture is then dry pressed to the desired shape in a suitable mold under a pressure of from 5 to 20 tons per square inch. The formed piece is fired to vitrification, as for example at a temperature of about 2500° F. for one hour. The piece is then preferably cooled at a slow rate in an oxidizing atmosphere.

The vitrified ceramic piece so produced may be permanently polarized to exhibit a remanent piezoelectric effect in the manner described in the aforementioned copending application; viz., by subjecting the piece to a unidirectional electrostatic field. Preferably the field is of the order of 25,000 volts per centimeter and is maintained for a sufficient time to induce a permanent piezoelectric effect. As explained in the copending application, removal of the field is followed by a decay of the electromechanical coupling coefficient with time, the electromechanical coupling coefficient approaching a stable value asymptotically. This decay may be accelerated by aging for several days at an elevated temperature, as for example at 50° C., after which aging process the electromechanical coupling coefficient becomes substantially stable.

While the material has been described as consisting essentially of barium titanate in an amount greater than 96% by weight and stannic oxide in an amount less than 4% by weight, it is preferred that the relative proportions be set at approximately 98% barium titanate and approximately 2% stannic oxide. A material of this preferred composition which has been prepared in accordance with the foregoing process has been found to exhibit an original electromechanical coupling coefficient immediately after polarization of about 19%, the stable value after aging being of the order of 14%. These values contrast with an original coupling coefficient of 17% and a final coupling coefficient of 12% for a ceramic piece consisting of substantially 100% barium titanate. Furthermore, the dielectric constant of a ceramic piece prepared in accordance with the present invention has been found to be of the order of 1,750, as compared with about 1,250 for a ceramic piece of substantially 100% barium titanate; this higher dielectric constant results in a greater capacity for a given size piece, and results in a greater response at audio frequencies.

As a further advantage of the present invention, it has been found that there is a substantial uniformity of characteristics of pieces prepared in accordance with the foregoing disclosure. This represents a substantial advance in the art, since one of the major difficulties encountered in the production of piezoelectric barium titanate ceramics has been the lack of uniformity between individual pieces.

While a particular process for preparing the material claimed as the present invention has been set forth, it is to be understood that this process is merely illustrative. No individual step in the process is critical, and certain departures from the procedure set forth may be made with no substantial effect on the properties of the resulting ceramic material. It is also to be noted that certain variations in the individual steps in the process may be required when it is desired to produce pieces of different shapes; such variations will occur to those skilled in the art.

The use of the term "consisting essentially of" in the appended claims is not intended to exclude small amounts of impurities or of deliberately added glass forming oxides in an amount of the order of 2% or less, since it is contemplated that such a small amount of impurities may be required to serve as a ceramic bond.

I claim:

1. A vitrified ceramic material consisting essentially of barium titanate in an amount greater than 96% by weight and stannic oxide in an amount less than 4% by weight.

2. A vitrified ceramic material consisting essentially of approximately 98% by weight of barium titanate and approximately 2% by weight of stannic oxide.

3. A vitrified ceramic material consisting essentially of barium titanate in an amount greater than 96% by weight and stannic oxide in an amount less than 4% by weight, polarized to exhibit permanent piezoelectric properties.

4. A vitrified ceramic material consisting essentially of approximately 98% by weight of barium titanate and approximately 2% by weight of stannic oxide, polarized to exhibit permanent piezoelectric properties.

ANTONIO R. RODRIGUEZ.

REFERENCES CITED

The following references are of record in the file of this patent:

UNITED STATES PATENTS

| Number | Name | Date |
|---|---|---|
| 2,402,515 | Wainer | June 18, 1946 |